United States Patent [19]

Williams et al.

[11] Patent Number: 5,085,507
[45] Date of Patent: Feb. 4, 1992

[54] DEVICE FOR THREE DIMENSIONAL TRACKING OF AN OBJECT

[75] Inventors: Rodney D. Williams, Plano; Felix Garcia, Jr., Round Rock, both of Tex.

[73] Assignee: Texas Instruments Incorporated, Dallas, Tex.

[21] Appl. No.: 457,439

[22] Filed: Dec. 27, 1989

[51] Int. Cl.$^5$ .............................................. G01B 11/26
[52] U.S. Cl. ................................. 356/152; 250/227.31
[58] Field of Search ....................... 356/141, 152; 250/227.14, 227.11, 227.28, 227.31

[56] References Cited

U.S. PATENT DOCUMENTS

| | | |
|---|---|---|
| 2,412,822 | 12/1946 | Malter . |
| 3,564,257 | 2/1971 | Berry et al. .......................... 356/141 |
| 3,942,009 | 3/1976 | Taylor ................................. 250/338.1 |
| 4,111,555 | 9/1978 | Ellis ..................................... 356/152 |
| 4,150,897 | 4/1979 | Roberts et al. ...................... 356/152 |
| 4,710,028 | 12/1987 | Grenier et al. ...................... 356/152 |
| 4,740,682 | 4/1988 | Frankel ............................... 356/152 |
| 4,825,063 | 4/1989 | Halldorsson et al. ........... 250/203 R |
| 4,896,962 | 1/1990 | Menn et al. ........................ 356/152 |

*Primary Examiner*—Stephen C. Buczinski
*Attorney, Agent, or Firm*—L. Joy Griebenow; James T. Comfort; Melvin Sharp

[57] ABSTRACT

A device for tracking an object (12) in three dimensional space is provided which comprises a fiber optic sensor array (14). Fiber optic sensor array (14) comprises a row plane (16) and a column plane (18) each comprising a plurality of parallel optical fibers bonded together. A row detector (20) is coupled to the ends of the fibers comprising row plane (16). A column detector (22) is coupled to the ends of the fibers comprising column plane (18). Row and column detectors (20) and (22) are coupled to a decoder circuit (24). First and second beam generators (26) and (28) are affixed to the object (12) and are each operable to transmit beams (30) and (32) which terminate on the fiber optic sensor array (14). By determining the points of incidence of beams (30) and (32), the decoder circuit (24) may determine the position of the object (12) in three dimensional space.

45 Claims, 4 Drawing Sheets

DEVICE FOR THREE DIMENSIONAL TRACKING OF AN OBJECT

TECHNICAL FIELD OF THE INVENTION

This invention relates in general to the field of electronic devices and more particularly to a device for tracking the position of an object in three dimensions.

BACKGROUND OF THE INVENTION

A variety of systems require the ability to track an object in three-dimensional space and to translate the position of the object into data which can be used by a computer system. One example of such an application is the tracking of the head position of a user of a virtual display system. In a virtual display system, an image is transmitted to a user which changes according to the field of view the user would ordinarily have if the virtual display system was not present. The virtual display system may be used, for example, to relay information to a pilot of an aircraft. The head position of the pilot must be tracked and translated into computer readable data in order for the virtual display system to function.

Present systems use electromagnetic coils coupled to the helmet of the pilot to achieve this head-tracking capability. These electromagnetic systems have several disadvantages. First, the electromagnetic environment of the cockpit produces a large amount of noise which interferes with the operation of the system. Further, the electromagnetic systems are very susceptible to possibly debilitating interference from an electromagnetic pulse resulting from a nuclear blast. An important concern in the design of virtual display systems used in warfare applications is to insure functionality of a system in such adverse conditions.

Accordingly, a need has arisen for a device for tracking an object in three-dimensional space and for translating the position of that object into a computer readable form. A further need has arisen for a tracking system which can operate efficiently in an environment having a great deal of electromagnetic interference.

SUMMARY OF THE INVENTION

In accordance with the present invention, a device for tracking the position of an object in three dimensions is provided which substantially eliminates or reduces disadvantages and problems associated with prior systems. More specifically, a device is provided which comprises a sensor operable to track the position of beams which are incident on a sensing surface of the sensor. The device further comprises first and second beam generators which are coupled to the object to be tracked and which are operable to transmit beams from the object to the sensing surface.

In an important technical advantage of the present invention, the combination of the points of incidence of two beams on the sensing surface allows for the direct mapping of a position of the object responsive to the points of incidence of the beams. In this manner, the position of the object can be calculated from these points of incidence and can be used by an integrated system dependent on the position of the object.

In a further important technical advantage, the beams may comprise lasers and the sensing surface may comprise a fiber optic array such that the tracking device is not susceptible to electromagnetic interference. Accordingly, the tracking device of the present invention can be used in an environment which contains a large amount of electromagnetic interference without contributing to the amount of interference in the environment or being affected by it.

In an additional technical advantage of the present invention, the configuration of the system is especially adaptable to a variety of environments. The sensor surface can be subdivided into as many separate surfaces as are necessary for a particular environment. Additional beam generators can be coupled to the object directed at any number of sensor surfaces to provide for the range of motion possible for the object. In this manner, any possible range of motion of an object to be tracked can be accommodated with the use of adaptable sensor surfaces and a predetermined number of beam generators.

BRIEF DESCRIPTION OF THE DRAWINGS

A more complete understanding of the present invention may be acquired by referring to the detailed description and claims when considered in connection with the accompanying drawings in which like reference numbers indicate like features and wherein:

DETAILED DESCRIPTION OF THE INVENTION

Figure 1:
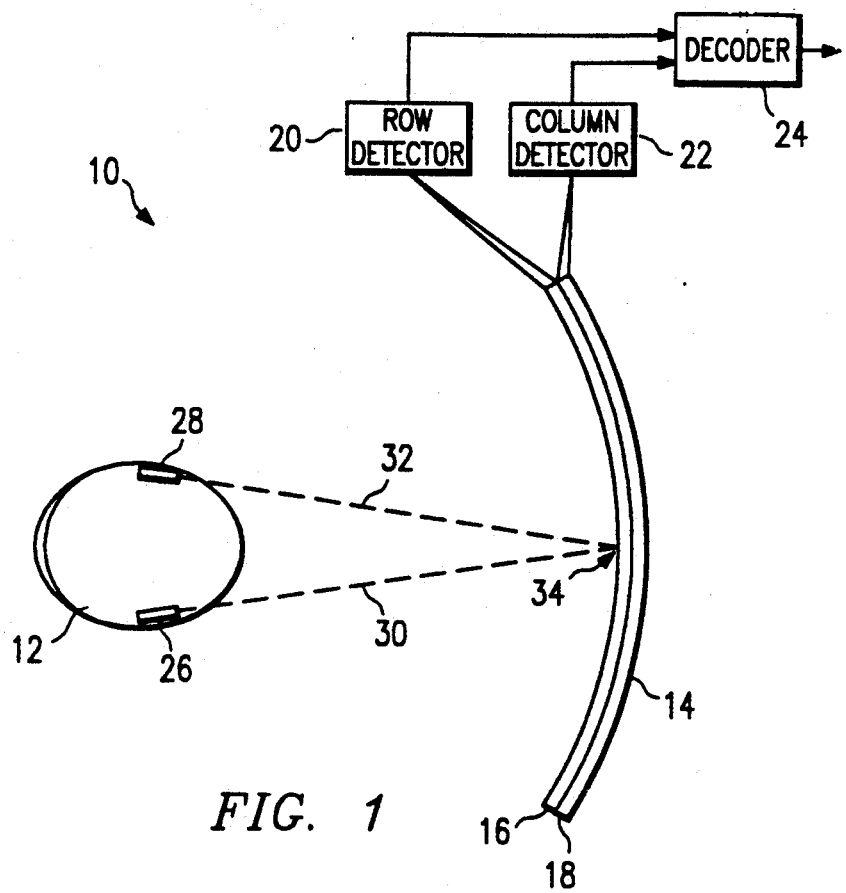
FIG. 1 is a schematic diagram illustrating the tracking system of the present invention.

Referring to FIG. 1, a tracking system indicated generally at 10 is shown, which is operable to track the position of an object 12 in three-dimensional space. System 10 comprises a fiber optic sensor array 14 which itself comprises a row plane of fibers 16 and a column plane of fibers 18.

The row plane 16 is coupled to a row detector 20 and the column plane 18 is coupled to a column detector 22. The row detector 20 and the column detector 22 are both coupled to a decoder circuit 24.

A first beam generator 26 and a second beam generator 28 are affixed to the object 12. First and second beam generators 26 and 28 generate first and second beams 30 and 32 along respective singular optical axes which are transmitted respectively from first and second beam generators 26 and 28 to fiber optic sensor array 14. First and second beam generators 26 and 28 may comprise, for example, laser diodes transmitting in the visible or nonvisible spectrums. As will be discussed herein, first and second beam generators 26 and 28 may or may not transmit at the same frequency. For purposes of teaching the technical advantages of the present invention, the system 10 will be described in terms of fiber optic sensor array 14 being in a fixed location while object 12 moves relative to this fixed location. It should be understood, however, that the teachings of the present invention are applicable to measure the location of object 12 relative to fiber optic sensor array 14 regardless of which is in motion and which is stationary.

The construction and operation of fiber optic sensor array 14 is fully described in applicant's co-pending application entitled "FIBER OPTICS INPUT DEVICE", Ser. No. 848,068, filed Apr. 4, 1986, now pending, the disclosure of which is hereby incorporated by reference into the present application. However, for purposes of clarity, the operate of the fiber optic sensor array 14 will be briefly summarized herein.

Fiber optic sensor array 14 comprises a row plane of optical fibers 16 and a column plane of optical fibers 18. The fibers of row plane 16 are disposed orthogonally to the fibers of column plane 18. The fibers in both planes 16 and 18 are bonded adjacent one another to form a plane of optical fibers. A portion of the cladding surrounding each of the fibers is removed to open a window into the fibers forming plane 16 and 18. A beam of light incident on the windows formed in the fibers forming row plane 16 and column plane 18 will be transmitted longitudinally along the fibers and will be detected by row detector 20 and column detector 22. Accordingly, a point of incidence of a beam on the fiber optic sensor array 14 may be determined by sensing which of the fibers forming the row and columns planes 16 and 18 are illuminated.

According to one embodiment of the fiber optic sensor array 14 of the present invention, groups of the optical fibers comprising row plane 16 and column plane 18 are coupled together. Each of these groups is coupled to a single sensor. This configuration permits the determination of the point of incidence of the beam at a particular intersection of a row fiber and a column fiber without the need for a single sensor at the end of each of the row and column optical fibers. As described with reference to FIG. 5 of Applicant's co-pending application, "FIBER OPTICS INPUT DEVICE", Ser. No. 848,068, dividing the optical fibers comprising row plane 16 into three groups and dividing the column plane of optical fibers into three groups and coupling each of these groups to six individual sensors enables the tracking of the point of incidence of a beam on the fiber optic sensor array 14.

The row detector 20 and column detector 22 may comprise, for example, Texas Instruments type TIL-414 phototransistors or, in another embodiment, may comprise Texas Instruments type TC-202 CCD image sensors. The presentation of these two embodiments is, of course, a design choice and should not be construed to limit the scope of the present invention to any particular device.

According to the teachings of the present invention, beam generators 26 and 28 transmit beams 30 and 32, respectively, to provide for either a single point of incidence indicated generally at 34 in FIG. 1 or dual points of incidence as will be discussed herein.

Figure 2A:
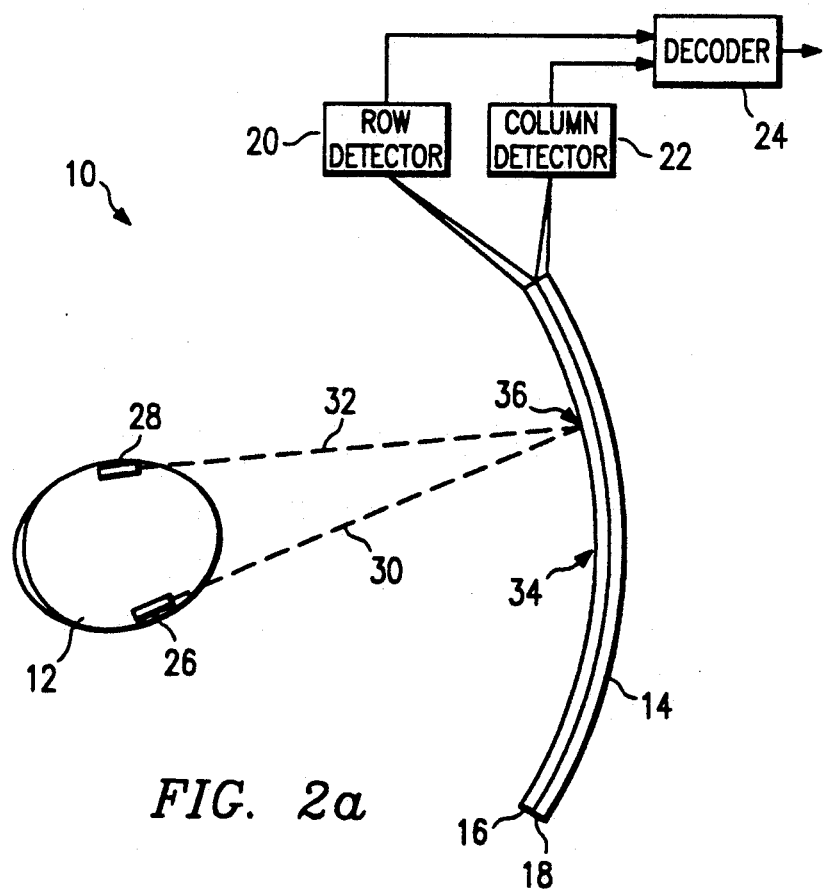
FIGS. 2a through 2c are schematic diagrams illustrating operation of the tracking system of the present invention.
Figure 2B:
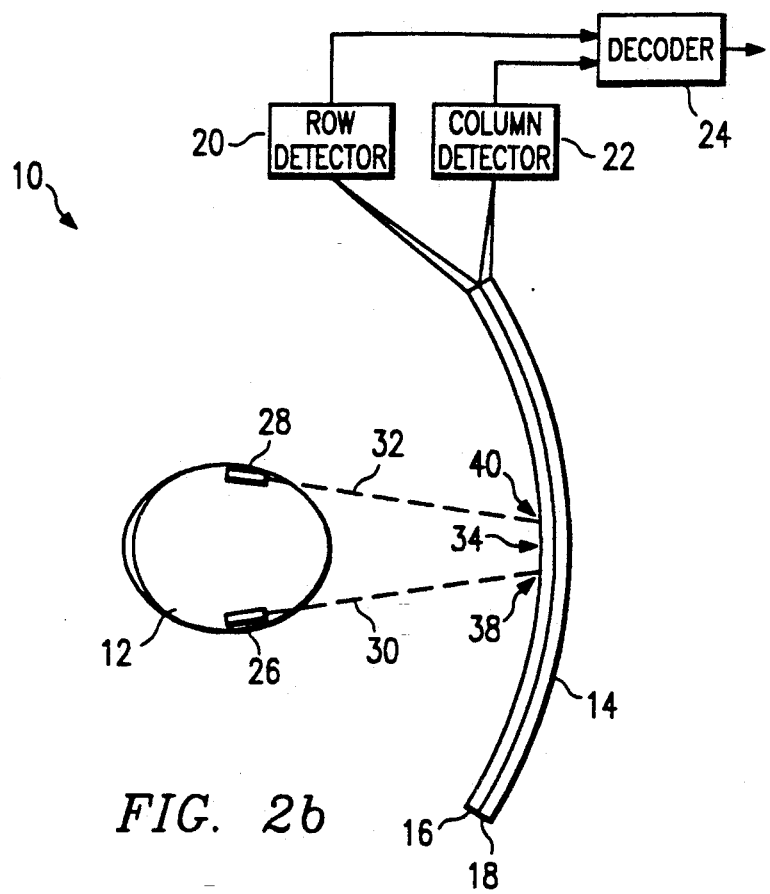
Figure 2C:
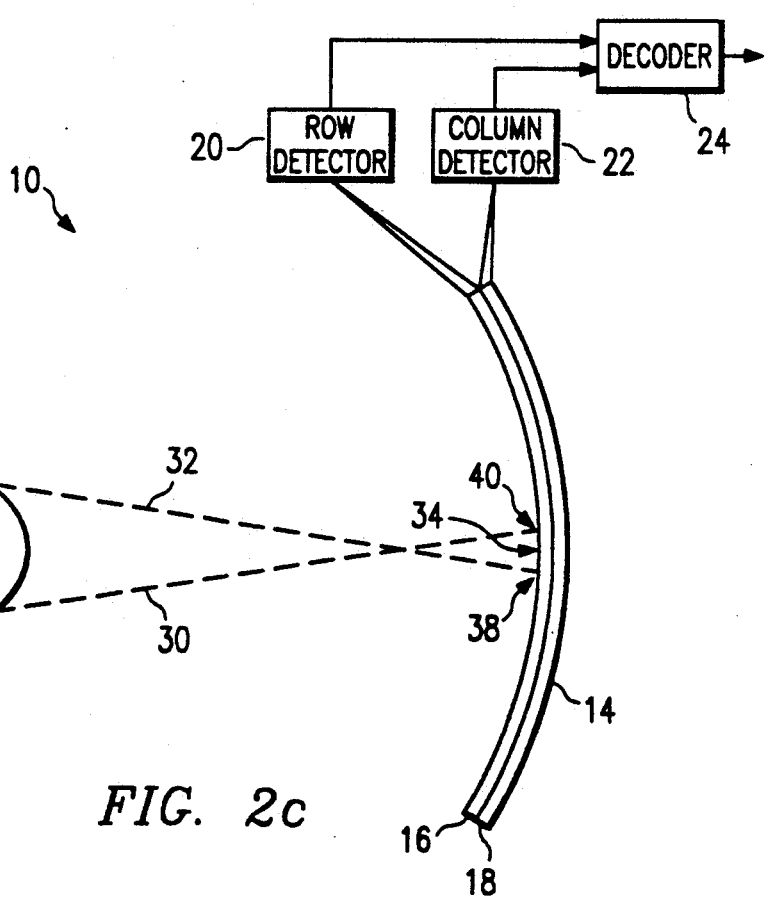

FIGS. 2a through 2c illustrate the operation of the device in tracking the position of object 12. Referring to FIG. 2a, the object 12 has rotated approximately thirty degrees about an axis perpendicular to the plant of FIG. 2a. This rotation has moved the beams 30 and 32 such that they provide for a new point of incidence indicated generally at 36 in FIG. 2a. This movement of beams 30 and 32 is detected by row detector 20 and column detector 22 in that beams 30 and 32 will now illuminate different fibers at point of incidence 36 than were illuminated at point of incidence 34. In this manner, decoder circuit 34 can calculate the new position of object 12 from the information transmitted from row detector 20 and column detector 22.

Referring to FIG. 2b, object 12 is shown in a position slightly closer to fiber optic sensor array 14. Accordingly, beams 30 and 32 terminate in new points of incidence 38 and 40, respectively. Points of incidence 38 and 40 are similarly detected by row detector 20 and column detector 22 which are operable to track more than one point of incidence. Row detector 20 and column detector 22 then transmit the encoded information relative to the location of points of incidence 38 and 40 to decoder 24, which can determine the new location of object 12 using this information.

It should be noted that beams 30 and 32 are transmitted such that they are not parallel to one another. Beams 30 and 32 are also transmitted such that they cross at a point corresponding to point of incidence 34 shown in FIG. 1. The convergence of beams 30 and 32 in this manner is a design choice selected for the purpose of minimizing the necessary size of fiber optic sensor array 14. If beam generators 26 and 28 were configured such that beams 30 and 32 diverged, beams 30 and 32 alone could define every possible rotation and translation of object 12. However, because of the choice of converging beams as shown in FIG. 1, there is some indeterminacy in the location of object 12. An example of this indeterminacy is shown in FIG. 2b and 2c. FIG. 2c illustrates a translation of object 12 directly away from fiber optic sensor array 14. At the single location shown in FIG. 2c, beams 30 and 32 once again terminate at points of incidence 38 and 40 on fiber optics sensor array 14. Accordingly, there are a series of points of indeterminacy which result from the use of convergent orientation of beams 30 and 32. This indeterminacy can be overcome in a variety of ways. First, the range of motion of object 12 could be restricted such that a translation of object 12 beyond the crossing point of the two beams is not an allowed condition. For example, if the object 12 represented the helmet of a pilot within a cockpit, the crossing point of the two beams could be configured such that point of incidence 34 occurred when the pilot's helmet was resting against the headrest within the cockpit. In this manner, as movement of the helmet beyond the headrest is impossible, the indeterminacy of the position of the object 12 is removed.

A further method by which the indeterminacy may be removed is to differentiate between beam 30 and beam 32. This may be done by using different frequency beams and incorporating frequency detection circuitry in row detector 20 and column detector 22. Similarly, beams 30 and 32 could be modulated at different frequencies or with different signal patterns, which could similarly be detected by row detector 20 and column detector 22. In this manner, the range of motion of object 12 would not have to be restricted and the location of the individual beams 30 and 32 could be tracked, removing the indeterminacy.

Figure 3:
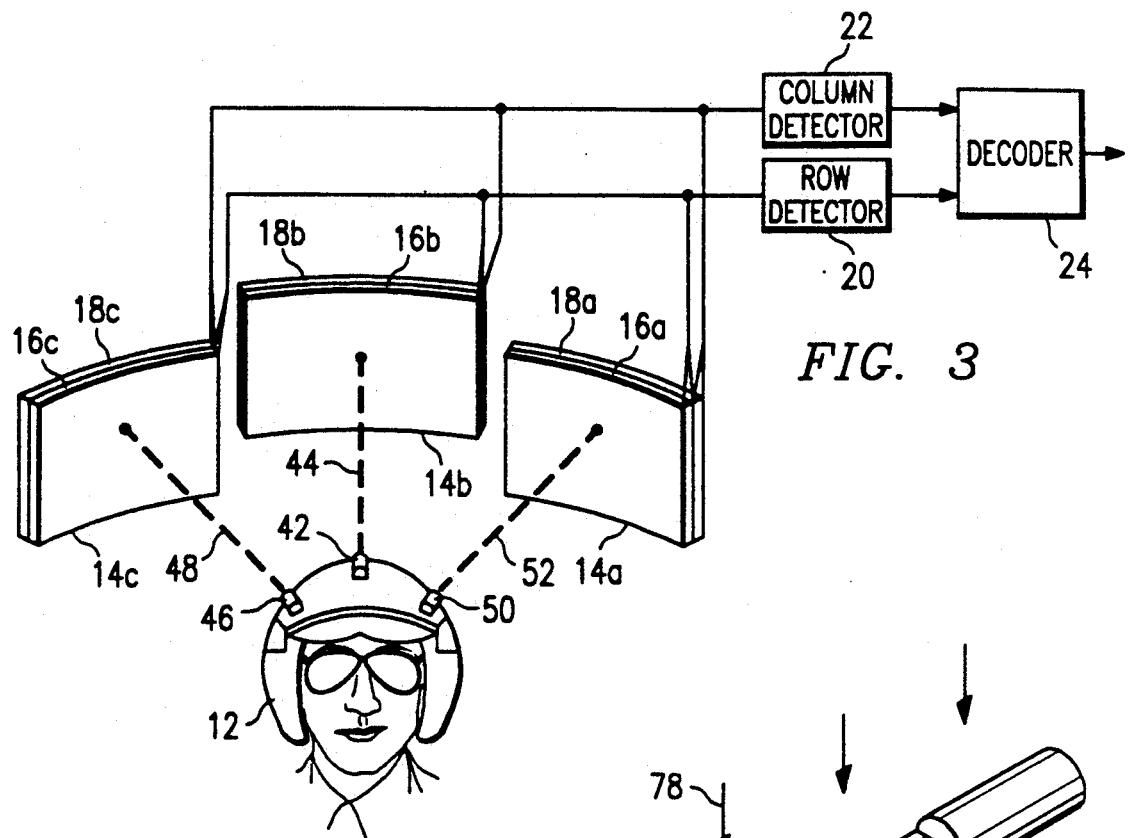
FIG. 3, a schematic diagram, illustrates an alternate embodiment of the tracking system of the present invention.

FIG. 3 illustrates a configuration of the system of the present invention where the fiber optic sensor array 14 is subdivided in order to adapt to a particular environment. Fiber optic sensor array 14 is shown in FIG. 3 to be subdivided into three fiber optic sensor array portions 14a, 14b and 14c. Each of fiber optic sensor array portions 14a, 14b and 14c comprise row plane 16a, 16b and 16c and column planes 18a, 18b and 18c. Each of row planes 16a, 16b and 16c are coupled to row detector 20. Each of column planes 18a, 18b and 18c are coupled to column detector 22. Row detector 20 and column detector 22 are coupled to decoder circuit 24. According to one embodiment of the present invention, fiber optic sensor array portions 14a, 14b and 14c define planes which are at right angles to one another.

A beam generator 42 transmits a beam 44 to fiber optic sensor array portion 14b. A beam generator 46 transmits a beam 48 to fiber optic sensor array portion 14c. Finally, a beam generator 50 transmits a beam 52 to fiber optic sensor array portion 14a. Beam generators 42, 46 and 50 are affixed to the object 12, which is shown in an exemplary manner to be the helmet of a pilot. Beam generators 42, 46 and 50 may be identical in construction to beam generators 26 and 28 discussed previously.

In operation, fiber optic sensor array portion 14a tracks the movement of beam 52 and relays that information to decoder 24. Similarly, fiber optic sensor array portion 14b tracks the movement of beam 44 and fiber optic sensor array portion 14c tracks the movement of beam 48. In this manner, the tracking system of the present invention may be adapted to a variety of environmental conditions. Whatever space is allowable for the placement of the fiber optic sensor arrays 14 may be utilized through the placement of a corresponding beam generator on the object to be tracked. It should be understood that while three beam generators 42, 46 and 50 are shown in FIG. 3, this configuration is presented solely for the purposes of teaching the present invention and should not be construed to limit the scope of the present invention. Any number of beam generators greater than or equal to two may be used, depending upon the specific environment of the object to be tracked. Any number of sensor array portions could be used as long as corresponding detector circuitry was operable to detect the incidence of a light beam on the sensor array portion. Further, the decoding of any number of sensor array inputs by decoder 24 can be accomplished by a variety of methods known in the art regardless of the number of beams or sensor array portions being utilized.

The fiber optic sensor array 14 is flexible in that variable resolutions can be used to allow for fine or coarse tracking of the object. Such a system may be implemented, for example, by using fibers of differing widths within the fiber optic sensor array 14. For example, the fiber optic sensor array 14 could use wider fibers at its periphery or in locations where high resolution tracking is not required. Similarly, small, densely packed fibers could be used where the highest resolution tracking is required. Further, similar coarse and fine tracking could be accomplished by using the same fiber size but coupling adjacent fibers together to simplify the detection circuitry in areas where the highest resolution tracking is not required.

Figure 4:
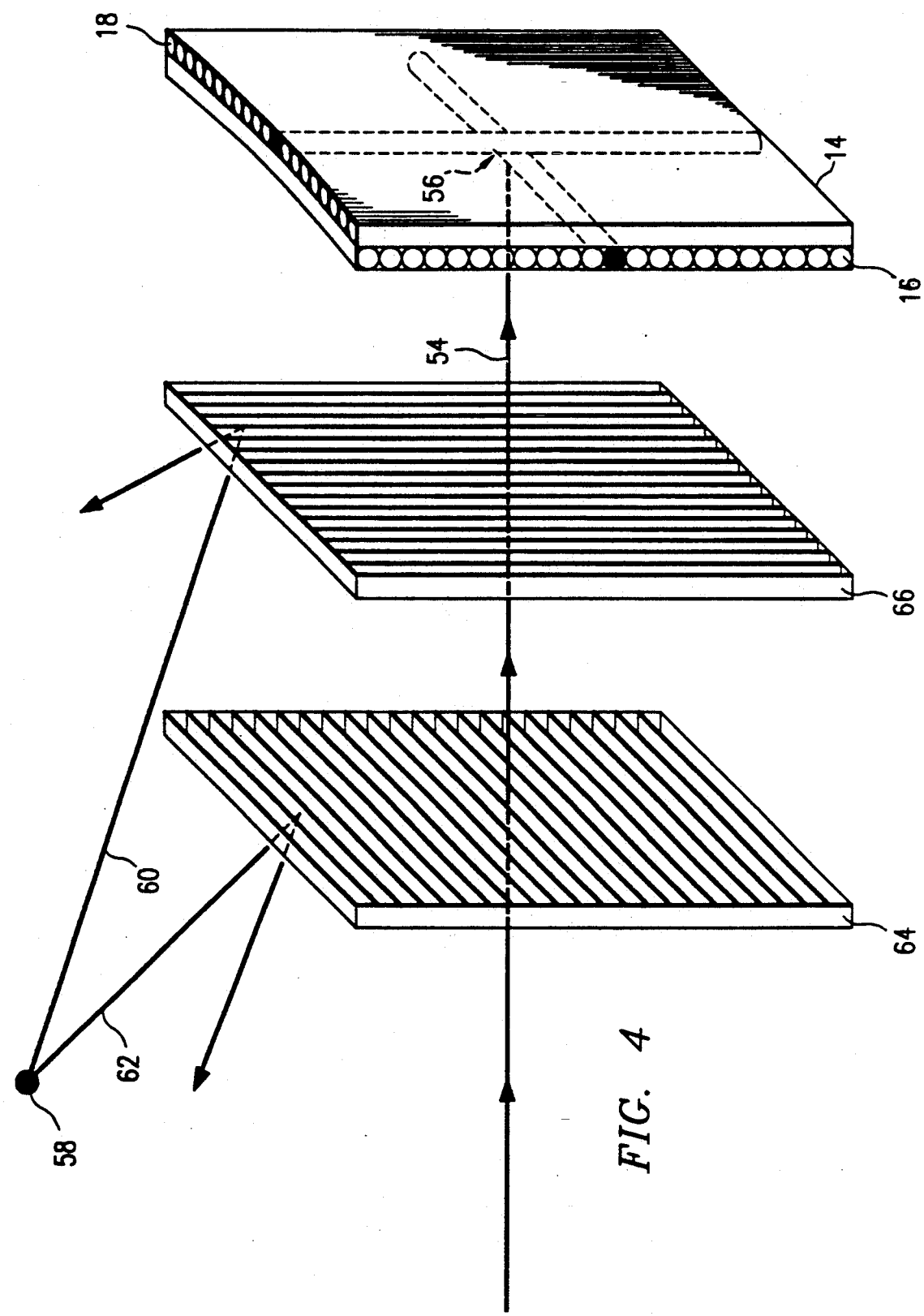
FIG. 4 is a schematic diagram illustrating a filter configuration to prevent interference from ambient light in the operation of the tracking system of the present invention.

FIG. 4 illustrates a method by which the tracking system of the present invention may be protected from interference from ambient light sources. Referring to FIG. 4, a portion of the fiber optic sensor array 14 is shown comprising row plane 16 and column plane 18. A plurality of the fibers comprising row plane 16 and column plane 18 are shown schematically. A beam 54 is shown incident on fiber optic sensor array 14 at a point indicated generally at 56. An off-angle light source 58 is shown transmitting off-angle beams 60 and 62. Beam 54 is transmitted through a first filter 64 and a second filter 66.

Filters 64 and 66 may comprise orthogonally orientated micro louvre structures which may comprise, for example, commercially available structures manufactured by 3M Corporation. Alternatively, filters 64 and 66 may comprise polarizing optical filters also orthogonally orientated with respect to one another. In operation, filters 64 and 66 serve to deflect off-angle beams 60 and 62 to insure a high signal-to-noise ratio for the fiber optic sensor array 14 and associated detection circuitry. Accordingly, through the use of filtering elements such as filters 64 and 66, off-angle illumination of the fiber optic sensor array 14 is prevented and thereby accurate tracking of the position of the beams incident on fiber optic sensor array 14 is insured.

A further concern associated with fiber optic sensor array 14 is the attenuation of the signals as the light is transmitted from a point of incidence of a beam to the point of connection of an optical fiber with either a row detector 20 or a column detector 22. According to one embodiment of the present invention, the cladding of each optical fiber is removed, resulting in a longitudinal window being opened into the fiber. This window allows for the entrance of light into the fiber so that it may be transmitted longitudinally along the fiber. However, the window also allows for the escape of light as it is being transmitted along the fiber which may result in attenuation of the signal.

Figure 5A:
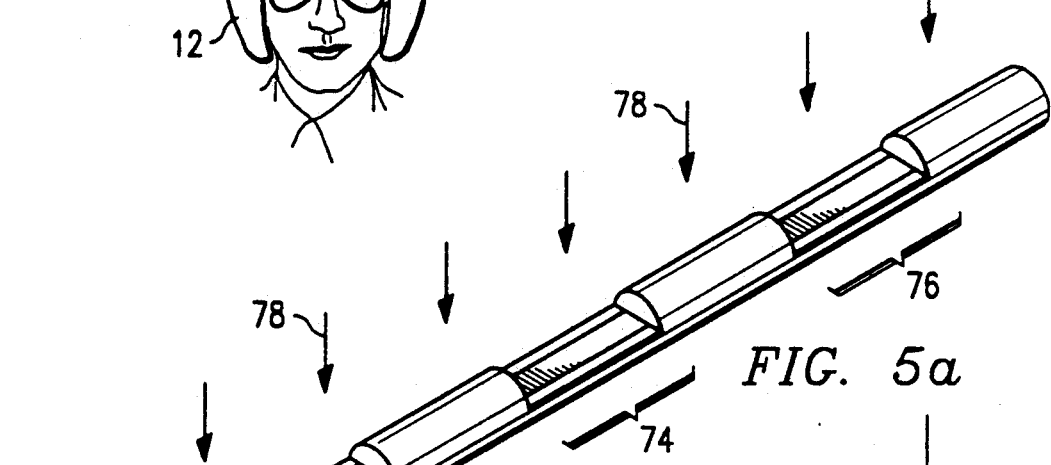
FIGS. 5a and 5b are isometric diagrams illustrating methods by which the cladding of the optical fibers might be configured to enable the efficient collection of signals used in the operation of the tracking device of the present invention.
Figure 5B:

Several alternate embodiments of the present invention are illustrated in FIGS. 5a and 5b. In FIG. 5a, a single optical fiber 68 is illustrated surrounded by its cladding 70. The cladding 70 is removed in selected portions along the longitudinal length of fiber 68. These portions are indicated generally at 72, 74 and 76 in FIG. 5a. The windows into fibers 68 within section 72, 74 and 76, allow for the entrance of light into fibers 68 from the direction of the arrows indicated generally at 78 in FIG. 5a.

In operation, light enters through the windows in sections 72, 74 and 76 and is transmitted along the longitudinal direction of fiber 68. The portions of the cladding 70 remaining between section 72, 74 and 76 reduce the attenuation of the signal as it travels along the longitudinal direction of fiber 68. The removal of only portions of the cladding 70 results in a corresponding decrease in the resolution of the fiber optic sensor array 14 when a plurality of the fibers 68 are bonded together in a plane. However, through the use of fine patterning of the cladding 70 after the fibers 68 have been bonded into a plane, the resulting loss of resolution can be controlled such that a desired resolution can be achieved.

FIG. 5b illustrates a second method for maximizing the collection of light beams into the fibers and for reducing the attenuation of the signals as they are transmitted along the length of the fibers within the fiber optic sensor array 14. FIG. 5b illustrates a fiber 80 surrounded by cladding 82. In the embodiment shown in FIG. 5b, a portion of the cladding 82 is removed to form a planar outer surface 84. Light is directed onto the fiber 80 in the direction of the arrows indicated generally at 86. In the embodiment illustrated in FIG. 5b, the outer surface of fiber 80 is not exposed directly to an incoming light beam. The light beam passes through the planar surface 84 into fiber 80 and is transmitted longitudinally along its length. Surface 84 may be roughened or otherwise treated to provide for a greater absorption of light into fiber 80. In this manner, the surface 84 provides for absorption of light into fiber 80 while the reflectivity of the inner surface of cladding 82 does not allow for the light to escape once it has passed within fiber 80.

In operation, the tracking system 10 of the present invention allows for the tracking of a position of an object in three-dimensional space. The system 10 utilizes light energy and fiber optic sensors and as such is not susceptible to electromagnetic interference. Accordingly, the tracking system of the present invention can be used in ambient conditions involving large amounts of electromagnetic interference without being affected by the noise or creating further electromagnetic interference. Further, the system 10 of the present invention is not affected by the electromagnetic pulse associated with a nuclear blast and is therefore adaptable to be used under such conditions.

The system 10 of the present invention enjoys the important technical advantage that it is extremely flexible in that the fiber optic sensor array 14 can be subdivided an additional beam generators can be incorporated such that whatever space is available within a closed environment can be utilized to track the position of the object.

The incorporation of beams having different frequencies or modulating different signals can further simplify the detection and decoding of the position of the object being tracked. The use of different frequency signals and corresponding filter circuitry within the column and row detector circuitries allows for the use of any number of beams with any number of fiber optic sensor array portions.

Although the present invention has been described in detail, it should be understood that various changes, substitutions and alterations could be made hereto without departing from the spirit and scope of the invention as defined by the appended claims.

What is claimed is:

1. A device for tracking the position of an object in three dimensions comprising:
    a sensor comprising a sensing array, said sensor operable to track the position of beams incident on said sensing array;
    a first beam generator coupled to the object and operable to transmit a first beam along only a first optical axis from the object to said sensing array; and
    a second beam generator coupled to the object and operable to transmit a second beam along only a first optical axis from the object to said sensing array.

2. The device of claim 1 wherein said sensor comprises:
    a fiber optic sensing array comprising said sensing array;
    detection circuitry coupled to said sensing array operable to determine the points at which said first and second beams are incident on said sensing array, said points of incidence determinative of the position of said object.

3. The device of claim 2 wherein said fiber optic sensing array comprises:
    column optical fibers comprising a first plurality of parallel, clad optical fibers forming columns of said array, each of said column optical fibers having an end and each having at least a portion of a longitudinal section of cladding removed from an outer surface of each of said column optical fibers forming a window therein permitting said beams to contact said column optical fibers and to be conducted therein; and
    row optical fibers proximate said row optical fibers comprising a second plurality of parallel, clad optical fibers forming rows of said array, each of said row optical fibers having an end and at least a portion of a longitudinal section of cladding removed from an outer surface of each of said row optical fibers forming a window therein permitting said beams to contact said row optical fibers and to be conducted therein.

4. The device of claim 3 wherein a portion of said outer surface of each of said fibers is roughened such that said beams are readily absorbed into said fibers and not substantially reflected out of said fibers.

5. The device of claim 3 wherein said fibers remain covered by a reduced amount of cladding in said windows such that said beam are readily absorbed into said fibers and not substantially reflected out of said fibers.

6. The device of claim 3 wherein said fibers have selected portions of said cladding removed resulting in a plurality of spaced apart windows, such that said beams are absorbed into said fibers through said windows and not substantially reflected out of said fibers between said windows.

7. The device of claim 3 wherein said detection circuitry comprises:
    column beam detection circuitry coupled to said ends of said column optical fibers for sensing said conductor beams and for providing first and second column signals responsive to said conducted beams indicative of column positions of incidence of said first and second beams; and
    row beam detection circuitry coupled to said ends of said row optical fibers for providing first and second row signals responsive to said conducted beams indicative of row positions of incidence of said first and second beams.

8. The device of claim 7 wherein said detection circuitries comprise a plurality of CCD cells coupled to said ends of said fibers.

9. The device of claim 7 wherein said detection circuitries comprise a plurality of phototransistor cells coupled to said ends of said fibers.

10. The device of claim 7 and further comprising:
    a decoder circuit coupled to said row and column beams detection circuitries and operable to generate signals indicating the positions of the object responsive to said first and second column signals and said first and second row signals.

11. The device of claim 2 wherein said fiber optic sensor array comprises a plurality of fiber optic sensor array portions separated from one another and wherein said detection circuitry comprises column and row detection circuits coupled to each of said fiber optic sensor array portions.

12. The device of claim 11 and further comprising a plurality of beam generators coupled to the object, each operable to transmit a beam from the object to one or more of said fiber optic sensor array portions.

13. The device of claim 1 wherein said first and second beam generators each comprise laser diodes operable to generate light beams directed toward said sensing array.

14. The device of claim 1 and further comprising a filter disposed between said sensing array and said beam generators such that beams incident on said sensing array will pass through said filter, said filter operable to shield said sensing array from ambient light sources other than said beam generators.

15. The device of claim 14 wherein said filter comprises:
   a first microlouvre device oriented in a first direction; and
   a second microlouvre device oriented at an angle to said first direction.

16. The device of claim 15 wherein said angle is ninety degrees.

17. The device of claim 14 wherein said filter comprises an optical filter polarized to prevent illumination of said sensing surface by off-angle light sources.

18. The device of claim 1 wherein said first and second beam generators are operable to generate said first and second beam at differing frequencies and wherein said sensor comprises circuitry for independently tracking the points of incidence of each of said first and second beams by differentiating between said differing frequencies.

19. The device of claim 1 wherein said first beam generator is operable to modulate said first beam to carry a first signal and wherein said second beam generator is operable to modulate said second beam to carry a second signal differing from said first signal and wherein said sensor comprises circuitry for independently tracking the points of incidence of each of said first and second beams by differentiating between said first and second signals.

20. A device for tracking the position of an object, comprising:
   a fiber optical sensing array spaced apart from the object and comprising:
   column optical fibers comprising a first plurality of parallel, clad optical fibers forming columns of said array, each of said column optical fibers having an end and each having at least a portion of a longitudinal section of cladding removed from an outer surface of each of said column optical fibers forming a window therein permitting light to contact each of said column optical fibers and to be conducted therein; and
   row optical fibers comprising a first plurality of parallel, clad optical fibers forming rows of said array, each of said row optical fibers having an end and each having at least a portion of a longitudinal section of cladding removed from an outer surface of each of said row optical fibers forming a window therein permitting light to contact each of said row optical fibers and to be conducted therein; and
   a first beam generator coupled to the object and operable to transmit a first beam from the object to said fiber optic sensing array such that said first beam may enter at a first point of incidence and be conducted within selected ones of said column and row optical fibers dependent on the position of the object;
   a second beam generator coupled to the object and operable to transmit a second beam from the object to said fiber optic sensing array such that said second beam may enter at a second point of incidence and be conducted within selected ones of said column and row optical fibers dependent on the position of the object;
   column beam detection circuitry coupled to said ends of said column optical fibers sensing said conducted beams and for providing first and second column signals responsive to said conducted beams indicative of column positions of said first and second points of incidence; and
   row beam detection circuitry coupled to said ends of said row optical fibers sensing said conducted beams and for providing first and second row signals responsive to said conducted beams indicative of row positions of said first and second points of incidence;
   a decoder circuit coupled to said row and column beam detection circuitries and operable to generate signals indicating the position of the object responsive said first and second column signals and said first and second row signals.

21. The device of claim 20 wherein said first and second beam generators each comprise laser diodes operable to generate light beams directed toward said fiber optic sensing array.

22. The device of claim 20 and further comprising a filter disposed between said fiber optic sensing array and said beam generators such that beams incident on said fiber optic sensing array will pass through said filter, said filter operable to shield said fiber optic sensing array from ambient light sources other than said beam generators.

23. The device of claim 22 wherein said filter comprises:
   a first microlouvre device oriented in a first direction; and
   a second microlouvre device oriented at an angle to said first direction.

24. The device of claim 23 wherein said angle is ninety degrees.

25. The device of claim 22 wherein said filter comprises an optical filter polarized to prevent illumination of said sensing surface by off-angle light sources.

26. The device of claim 20 wherein said detection circuitries comprise a plurality of CCD cells coupled to said ends of said fibers.

27. The device of claim 20 wherein said detection circuitry comprises:
   column beam detection circuitry coupled to said ends of said column optical fibers for sensing said conductor beams and for providing first and second column signals responsive to said conducted beams indicative of column positions of incidence of said first and second beams; and
   row beam detection circuitry coupled to said ends of said row optical fibers for providing first and second row signals responsive to said conducted beams indicative of row positions of incidence of said first and second beams.

28. The device of claim 20 wherein said fiber optic sensor array comprises a plurality of fiber optic sensor array portions separated from one another and wherein said detection circuitry comprises column and row detection circuits coupled to each of said fiber optic sensor array portions.

29. The device of claim 28 and further comprising a plurality of beam generators coupled to the object, each operable to transmit a beam from the object to one or more of said fiber optic sensor array portions.

30. The device of claim 20 wherein said first and second beam generators are operable to generate said first and second beam at differing frequencies and wherein said row and column beam detection circuitries comprise circuitry for independently tracking the points of incidence of each of said first and second beams by differentiating between said differing frequencies.

31. The device of claim 20 wherein said first beam generator is operable to modulate said first beam to carry a first signal and wherein said second beam generator is operable to modulate said second beam to carry a second signal differing from said first signal and wherein said row and column beam detection circuitries comprise circuitry for independently tracking the points of incidence of each of said first and second beams by differentiating between said first and second signals.

32. The device of claim 20 wherein said outer surface of each of said fibers is roughened such that said beams are readily absorbed into said fibers and not substantially reflected out of said fibers.

33. The device of claim 20 wherein said fibers remain covered by a reduced amount of cladding in said windows such that said beam are readily absorbed into said fibers and not substantially reflected out of said fibers.

34. The device of claim 20 wherein said fibers have selected portions of said cladding removed resulting in a plurality of spaced apart windows, such that said beams are absorbed into said fibers through said windows and not substantially reflected out of said fibers between said windows.

35. A method for tracking the position of an object in three dimensions, comprising the steps of:
    transmitting a first beam along only a first optical axis from the object to a sensing array of a sensor;
    transmitting a second beam along only a first optical axis from the object to the sensing array not parallel to the first beam;
    detecting the points at which the first and second beams are incident on the sensing array, the points of incidence indicating the position of the object.

36. The method of claim 35 and further comprising the step of preventing light from off angle light sources from impinging on the sensing array.

37. The method of claim 35 wherein said steps of detecting comprises the step of detecting the conductance of the first and second beams within row and column optical fibers of a fiber optic sensor array.

38. The method of claim 37 wherein said step of detecting the conductance comprises the step of detecting the conductance of the first and second beams using a CCD detector coupled to each of the row and column optical fibers.

39. The method of claim 37 wherein said step of detecting the conductance comprises the step of detecting the conductance of the first and second beams using a phototransistor detector coupled to each of the row and column optical fibers.

40. The method of claim 37 wherein said step of detecting the conductance comprises the steps of generating first and second column signal indicative of the column positions of the points of incidence of the first and second beams, respectively;
    generating first and second row signals indicative of the row positions of the points of incidence of the first and second beams, respectively;
    transmitting the first and second row and column signals to a decoder circuit;
    decoding the first and second row and column signals in the decoder circuit and generating signals indicative of the position of the object responsive to the first and second row and column signals.

41. The method of claim 35 wherein said step of transmitting a second beam comprises the step of transmitting the second beam to a sensing array portion of the sensing array spaced apart from the remainder of the sensing array.

42. The method of claim 35 and further comprising the steps of:
    transmitting a third along only a third optical axis beam from the object to the sensing array; and
    detecting the point at which the third along only a third optical axis beam is incident on the sensing array.

43. The method of claim 35 and further comprising the steps of:
    transmitting a plurality of along respective singular optical axes beams from the object to a plurality of sensing array portions spaced apart from one another; and
    detecting the points at which the plurality of along respective singular optical axes beams are incident of the plurality of sensing array portions.

44. The method of claim 35 wherein said step of transmitting a second beam comprises the step of transmitting the second beam at a different frequency then the first beam and wherein said step of detecting comprises the step of differentiating between the first and second beams responsive to the differing frequencies.

45. The method of claim 35 wherein said step of transmitting a first beam comprises the step of modulating the first beam to carry a first signal and wherein said step of transmitting a second beam comprises the step of modulating the second beam to carry a second signal and wherein said step of detecting comprises the step of differentiating between said first and second beams responsive to the receipt of said first and second signals.

* * * * *